United States Patent
Sinha et al.

(10) Patent No.: US 12,154,159 B2
(45) Date of Patent: Nov. 26, 2024

(54) METHODS AND SYSTEMS FOR DETERMINING HOUSEHOLD CHARACTERISTICS

(71) Applicant: Walmart Apollo, LLC, Bentonville, AR (US)

(72) Inventors: Nimesh Sinha, San Jose, CA (US); Sneha Gupta, Santa Clara, CA (US); Rishi Rajasekaran, Sunnyvale, CA (US); Yue Xu, San Francisco, CA (US); Yokila Arora, San Jose, CA (US); Hyun Duk Cho, San Francisco, CA (US); Sushant Kumar, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 121 days.

(21) Appl. No.: 17/589,003

(22) Filed: Jan. 31, 2022

(65) Prior Publication Data

US 2023/0245202 A1    Aug. 3, 2023

(51) Int. Cl.
  *G06Q 30/02*  (2023.01)
  *G06Q 30/0204*  (2023.01)
  (Continued)

(52) U.S. Cl.
  CPC ..... *G06Q 30/0631* (2013.01); *G06Q 30/0204* (2013.01); *G06Q 30/0271* (2013.01)

(58) Field of Classification Search
  CPC ........... G06Q 30/0631; G06Q 30/0204; G06Q 30/0271
  See application file for complete search history.

(56) References Cited

U.S. PATENT DOCUMENTS 10,096,319 B1 *  10/2018  Jin .................... G10L 25/66
11,062,377 B1 *  7/2021  Piroska ............. G06Q 30/0631
(Continued)

FOREIGN PATENT DOCUMENTS

| CN | 111080401 A | * | 4/2020 | ......... G06Q 30/0201 |
| CN | 111582964 A | | 8/2020 | |
| WO | 2020130369 A1 | | 6/2020 | |

OTHER PUBLICATIONS

"Clustering: Out of the Black Box—K-means and Gaussian Mixture Models" (Jones, Jenna; Published in Towards Data Science on Feb. 9, 2021 at https://towardsdatascience.com/clustering-out-of-the-black-box-5e8285220717 ) (Year: 2021).*

(Continued)

*Primary Examiner* — James M Detweiler
(74) *Attorney, Agent, or Firm* — Morgan, Lewis & Bockius LLP; Manita Rawat

(57) ABSTRACT

A system and method for recommending products based on characteristics of a customer's household. The system and method associates age dependent products with developmental stages on a universal developmental scale and determines a subset of age dependent products based on prior engagements by the customer's household. Using the development stages associated with the subset of age dependent products characteristics of the customer's household may determine specifically the number and ages of juveniles in the customer's household. Performing Gaussian mixture model or multivariate kernel density estimation on the developmental stages associated with the engagements of customer's household, the age(s) and number of juveniles respectively may be determined and recommendations of products and services to the customer or customer's household based upon these characteristics may be advantageously made.

20 Claims, 7 Drawing Sheets

(51) Int. Cl.
*G06Q 30/0251* (2023.01)
*G06Q 30/0601* (2023.01)

(56) References Cited

U.S. PATENT DOCUMENTS

| | | | |
|---|---|---|---|
| 11,282,124 B1* | 3/2022 | Yoon | G06Q 30/0631 |
| 2009/0094138 A1* | 4/2009 | Sweitzer | G06Q 30/06 |
| | | | 705/26.1 |
| 2009/0276289 A1 | 11/2009 | Dickinson et al. | |
| 2016/0055236 A1 | 2/2016 | Frank et al. | |
| 2017/0308924 A1* | 10/2017 | Jeon | G06Q 30/0269 |
| 2018/0005302 A1 | 1/2018 | Ouimet et al. | |
| 2019/0180358 A1* | 6/2019 | Nandan | G06F 18/2113 |
| 2021/0133242 A1* | 5/2021 | Srinivasan | H04N 21/4532 |
| 2021/0150552 A1 | 5/2021 | Ayzenshtat et al. | |
| 2021/0342925 A1 | 11/2021 | MacDougall et al. | |
| 2022/0027562 A1* | 1/2022 | Zhang | G06F 3/0481 |

OTHER PUBLICATIONS

"Marketing Automation and Personalization Suite for Online Baby and Kids Retailers" REES46 Technologies, May 2017.

Bocklet, et al. "Age Determination of Children in Preschool and Primary School Age with GMM-based Supervectors and Support Vector Machines/Regression" Text, Speech and Dialogue, 11th International Conference, TSD 2008, Brno, Czech Republic, Sep. 8-12, 2008, Proceedings, 1-9.

Groß, et al., "Estimating the density of ethnic minorities and aged people in Berlin: Multivariate kernel density estimation applied to sensitive geo-referenced administrative data protected via measurement error", Journal of the Royal Statistical Society Statistics in Society Series A, Feb. 2016, 180(1): 161-183.

* cited by examiner

METHODS AND SYSTEMS FOR DETERMINING HOUSEHOLD CHARACTERISTICS

TECHNICAL FIELD

The disclosed subject matter relates generally to the determination of characteristics of a consumer's household in order gain an understanding of the household and thus provide tailored recommendations of products and services. Specifically, the disclosed subject matter determines the number and ages of children in a customer's family, in order to enhance the customer's shopping experience.

BACKGROUND

Current technology related to on-line shopping platforms cannot identify characteristics of the customer's household related to number and ages of the juvenile members. This inability can limit the recommendations and effectiveness of marketing directed to the customer.

Additionally, the diversity and applicability of scales in which products and services are associated with developmental stages of juveniles, further hampers the recommendations and effectiveness of marketing directed to the customer. Understanding age related products is important to helping parents throughout their shopping experience during the stages of a child's development, unfortunately children's products such as diapers and baby food have disparate age identifying attributes. Different products have different attributes which may be associated with the age (or developmental stage, or size associated with an age range) as illustrated in Table 1.

TABLE 1

| Product | Product Attributes | Attributes Value (e.g. age, developmental stage) |
|---|---|---|
| Diaper | size | size1, size2, size3, size4 . . . |
| Clothes | baby_clothing_size | Preemie, Newborn, 3-6 Months, 3 T, 4 T, 2-3 yrs |
| Foods | baby_food_stage | stage 1, stage 2, stage 3 . . . |
| Toys | age_range | 2-4 Months, 1-2 yrs., 5+, 12 up |

In order to effectively make marketing decisions and recommendations, the retailer needs to understand the correspondences between these different attributes and the respective overlaps, in addition to knowledge of the age or developmental stage of a juvenile household member. Furthermore, an attempt to ascertain these characteristics of the household based upon product engagements becomes more fraught with uncertainties because of these disparate scales and attributes.

The disclosed subject matter addresses these problems by first establishing a universal scale that distinguishes early developmental stages of children, and then identifies these attributes of the products and services, and translates them into the correct range on a universal scale. The products and services are associated with the age or developmental stage. Further, leveraging the association with the universal scale, the disclosed subject matter, utilizing the customer household's engagements with product or services that are associated with age or developmental stages on the universal scale may be analyzed using a classic methodology of Gaussian Mixture Model to predict the age(s) of juvenile members of a customer's household. An evaluation metric is based on statistical reasoning validates the performance of the model.

Placing the customer's children in the appropriate developmental stage aids in the understanding of the parent's particular shopping needs enables dynamic understanding of children's age(s) and further enables continuing information regarding the development of juveniles in the household allowing the retailer to provide better shopping guidance for customers throughout their parenting journey. Thus correct age identification aids with ads targeting, recommendations, and customer relationship management (CRM). Moreover, as parents need to purchase a lot of products with the appropriate age attribute (e.g. a particular size for diapers) especially during early stages of children's development, correctly predicting children's age(s) and anticipating such needs, creates a smooth and personalized shopping journey for parents along with increased revenue potential, and customer loyalty.

Similarly, knowing the number of children in a customer's household is also an important part of understanding one's parenting journey. Similarly, knowing the number of children enables the identification and distinguishing between different shopping journeys for one customer, and further enables better shopping guidance for customers throughout their parenting journey. Without a prior understanding the number of children, effective selection of recommendations, properly tailored marketing and dispensing of appropriate parent guidance can be hindered by otherwise seemingly erratic purchasing behavior. With a correctly predicted number of children in a customer's household, the retailer may build a focused journey around each child, generating more sales and customer satisfaction.

The disclosed subject matter to address these issues similarly leverages the association of products and services with the universal scale, and the prior engagements of customer's household with those product or services to determine the number of children in the customer's household. The engagements may be analyzed using a classic methodology of multivariate kernel density estimation in predicting the number of children in a customer's household or associated with a customer.

SUMMARY

The embodiments described herein are directed to systems and methods for determining household characteristics based at least in part on past household engagements with the retailer In addition to or instead of the advantages presented herein, persons of ordinary skill in the art would recognize and appreciate other advantages as well.

In accordance with various embodiments, exemplary systems may be implemented in any suitable hardware or hardware and software, such as in any suitable computing device.

In some embodiments, a system for recommending products based on characteristics of a customer's household. The system including a computing device connected to a database via a communication system, the computing device associating age dependent products in the database with developmental stages on a universal developmental scale; determining, a subset of age dependent products based on prior engagements by the customer household; and retrieving, from the database, the development stages associated with the subset of age dependent products. The computing device also performing Gaussian Mixture modeling upon the retrieved development stages, and from the results of the Gaussian Mixture modeling, determining a developmental stage (i.e. age(s)) associated with the customer household; and, recommending selective ones of age dependent products to the customer's household based upon the determined developmental stage.

In other embodiments, a method for recommending products based on characteristics of a customer's household is provided. The method including associating a plurality of age dependent products with a developmental stage on a universal developmental scale, where the universal developmental scale includes of a plurality of sequential developmental stages; determining, a subset of age dependent products based on engagements by the customer household; and retrieving the development stages associated with each of determined subset of age dependent products in the subset. The method further including performing a Gaussian mixture modeling upon the retrieved development stages, determining a developmental stage associated with the customer's household based on results from the Gaussian mixture model; and, recommending selective ones of age dependent products to the customer household based upon the determined developmental stage.

In yet other embodiments, a non-transitory computer readable medium having instructions stored thereon is provided. The instructions, when executed by at least one processor, cause a device to perform operations including associating age dependent products with a developmental stage on a universal developmental scale; determining; a subset of age dependent products based on engagements by the customer household; and retrieving the development stages associated with the subset of age dependent products. The operations further including performing Gaussian mixture modeling upon the retrieved development stages, determining a developmental stage associated with the customer household based on results from the Gaussian mixture model; and, recommending age dependent products to the customer household based upon the determined developmental stage.

In additional embodiments, a system for recommending products based on characteristics of a customer's household. The system including a computing device connected to a database via a communication system, the computing device associating a age dependent products in the database with developmental stages on a universal developmental scale; determining, a subset of age dependent products based on prior engagements by the customer's household; and retrieving, from the database, the development stages associated with the subset of age dependent products. The computing device also performing a multivariate kernel density estimation upon the retrieved development stages, and from the results of the estimation, determining a number of juveniles (i.e. number of developmental stages) associated with the customer's household; and, recommending products to the customer's household based upon the number of juveniles.

In still other embodiments, a method for recommending products based on characteristics of a customer's household is provided. The method including associating a plurality of age dependent products with a developmental stage on a universal developmental scale, where the universal developmental scale includes of a plurality of sequential developmental stages; determining, a subset of age dependent products based on engagements by the customer's household; and retrieving the development stages associated with each of determined subset of age dependent products in the subset. The method further including performing a multivariate kernel density estimation upon the retrieved development stages, determining a number of juveniles associated with the customer's household based on results from the estimation; and, recommending products to the customer's household based upon the determined developmental stage.

In further embodiments, a non-transitory computer readable medium having instructions stored thereon is provided. The instructions, when executed by at least one processor, cause a device to perform operations including associating age dependent products with a developmental stage on a universal developmental scale; determining; a subset of age dependent products based on engagements by the customer's household; and retrieving the development stages associated with the subset of age dependent products. The operations further including performing a multivariate kernel density estimation upon the retrieved development stages, determining a number of juveniles associated with the customer's household based on results from the estimations; and, recommending products to the customer's household based upon the number of juveniles.

In yet further embodiments, a system for reconciling product attribute scales to a universal scale. The system including a computing device connected to a database via a communication system, the computing device correlating a first scale and a second scale with a universal developmental scale; associating age dependent products in the database with one or more developmental stages on the universal developmental scale based upon the correlation; and, transmitting each of the associated one or more developmental stages to the database over the communication system for storage with the respective age dependent product in the database; wherein some of the age dependent products are associated with the first scale and others of the are associated with the second scale which is different from the first scale.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

Figure 1:
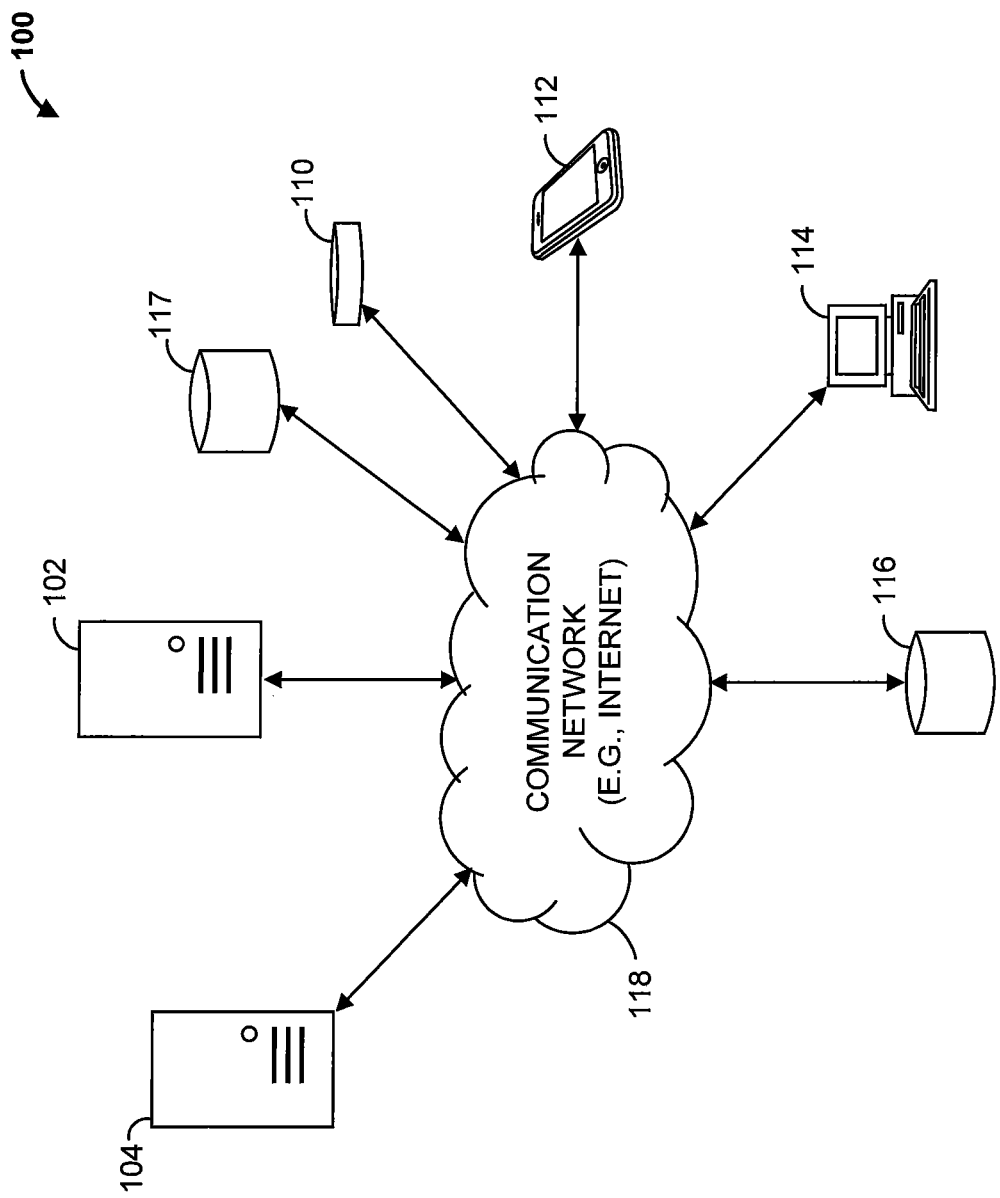
FIG. 1 is a block diagram of communication network for determining household characteristics in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

DETAILED DESCRIPTION

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a communication system 100 that includes a household characteristic determining computing device 102 (e.g., a server, such as an application server), a web server 104, databases 116 and 117, and multiple customer computing devices 110, 112, 114 operatively coupled over network 118.

A household characteristic determining computing device 102, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, or through the communication network 118.

In some examples, the household characteristic computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, intent-free answering computing device 102, and web server 104 are operated by a retailer, and multiple customer computing devices 112, 114 are operated by customers of the retailer.

Although FIG. 1 illustrates three customer computing devices 110, 112, 114, communication system 100 can include any number of customer computing devices 110, 112, 114. Similarly, the communication system 100 can include any number of workstation(s) (not shown), intent free answering computing devices 102, web servers 104, and databases 116 and 117.

The household characteristic determining computing device 102 is operable to communicate with databases 116 over communication network 118. For example, household characteristic determining computing device 102 can store data to, and read data from, databases 116 and 117. Databases 116 may be remote storage devices, such as a cloud-based server, a disk (e.g., a hard disk), a memory device on another application server, a networked computer, or any other suitable remote storage. Although shown remote to the household characteristic determining computing device 102, in some examples, databases 116 and 117 may be a local storage device, such as a hard drive, a non-volatile memory, or an USB stick. The household characteristic determining computing device 102 may store data from workstations or the web server 104 in database 116. In some examples, storage devices store instructions that, when executed by household characteristic determining computing device 102, allow intent free answering computing device 102 to determine one or more s results in response to a user query.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Figure 2:
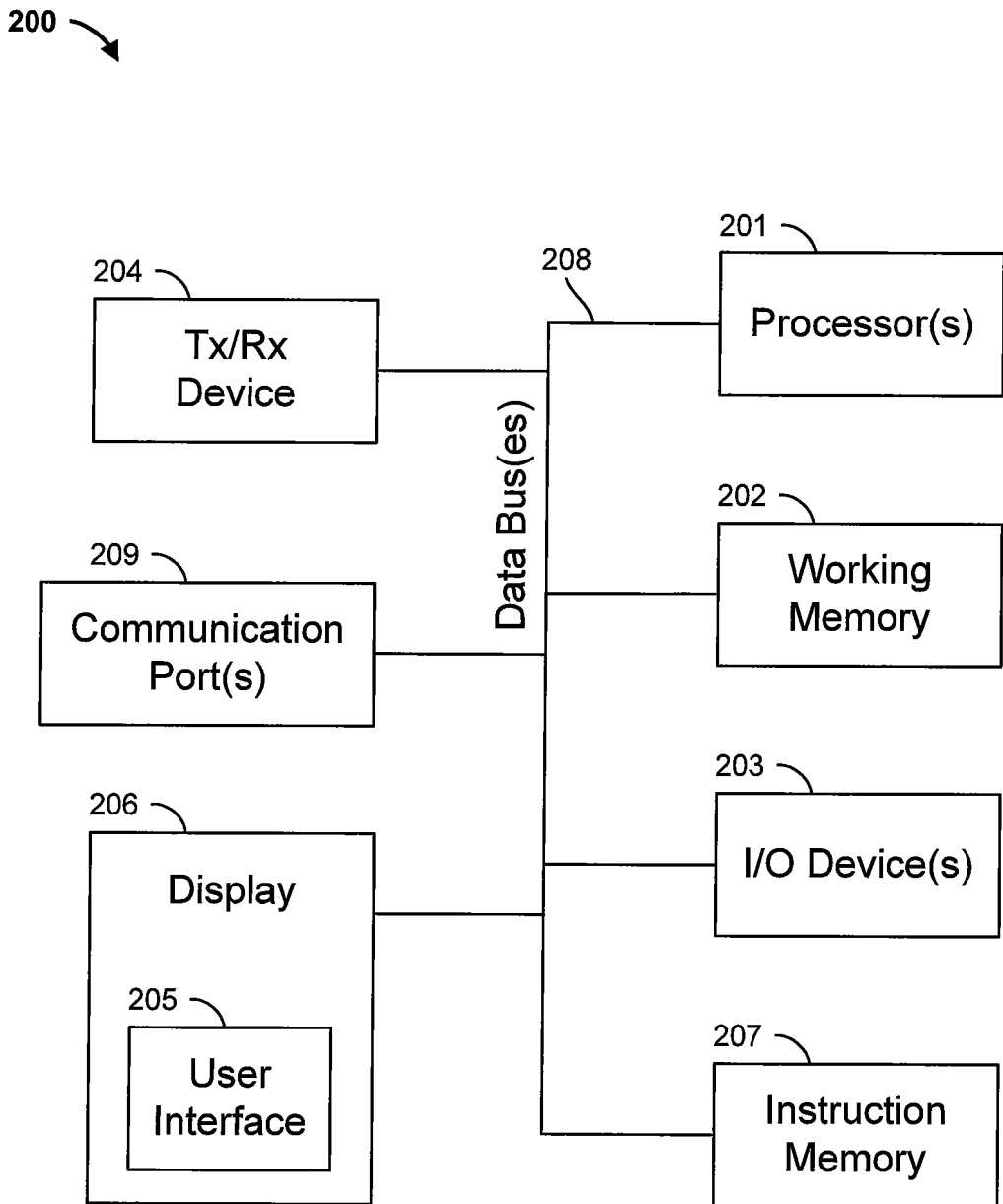
FIG. 2 is a block diagram of the household characteristic determining computing device of the communication system of FIG. 1 in accordance with some embodiments.

FIG. 2 illustrates the household characteristic determining computing device 102 of FIG. 1. Household characteristic determining computing device 102 may include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more processing cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of intent free answering computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with household characteristic determining computing device 102. In some examples, a user can interact with user interface 205 by engaging input-output devices 203. In some examples, display 206 can be a touchscreen, where user interface 205 is displayed by the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 household characteristic determining computing device 102 will be operating in. Processor(s) 201 is operable to receive data from, or send data to, a network, such as communication network 118 of FIG. 1, via transceiver 204.

Figure 3:
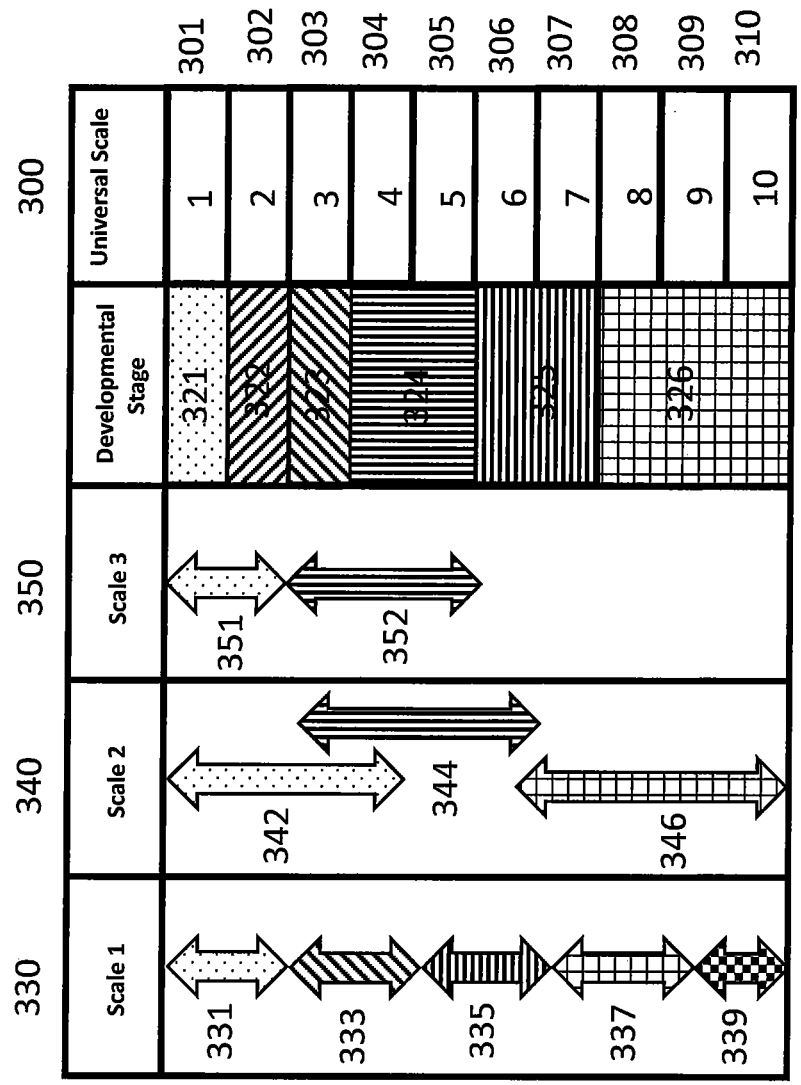
FIG. 3 is a schematic diagram representing the correspondence of a universal scale with disparate scales in accordance with embodiments of the disclosed subject matter.

FIG. 3 illustrates a schematic diagram of the creation of a universal scale in which to associated products and services with developmental stages of children. Creation of a universal scale is a precursor to the household characteristic modelling system and method generally illustrated in FIG. 4.

Referring back to FIG. 3, as described previously, age labels from different product types are required to be translated into a single labeling schema to distinguish developmental stages of children from newborn to pre-teen. The universal scale 300 is shown in ten increments from 301-310. These increments may be representative of years, or months, or factions/multiples thereof, they may be constant value increments, or of varying size, any number of increments may be used to cover the desired developmental stages. More increments generally allow for greater granularity. For example, during the first year in may be advantageous to have greater granularity such that each quarter of the year is associated with a different universal scale value, whereas preteens between the ages of 10 and 13 may be represented by only one value on the universal scale. Three product scales are illustrated in FIG. 3 corresponding to the development stages ranging from 321-326. The first product scale 330 may be for example clothes or shoes in which multiple sizes 331, 333, 335, 337 and 339 span the developmental stages. The second product scale 340 may be for toys, such that the same toy scale value 342, 344 or 346 product value may be associated with multiple developmental stages, and may also overlap with other scale values, for example the end of 342 overlaps the scale value 344. The third scale 350 may be representative of accessories, such as baby bottles 351, sippy cups 352, etc., in which the accessory is normally used over one or more development stages and then a different product is used, i.e. a child moves from a bottle to a sippy cup with little overlap. The different scales 330, 340, 350 may also be representative of the same type of product but from different suppliers using different scales.

In the universal scale 300, the products and product scales, irrespective of the relative scale or attribute used to describe the appropriate targeted developmental stage, may be associated with one or more values on the universal scale 300. Thus products associated with value 333 on scale 330, value 344 on scale 340, or value 352 on scale 350 would all be appropriately associated with and reflective of a child associated with value "4" 304 on the universal scale. Thus, as described further below, a customer selecting products with respective values of 333, 344 and 352 could be assumed to have a household with a child in developmental stage 323 or 324 associated respectively with universal scale "3" 303 or "4" 304. This association over multiple products and services as describe in the present subject matter may narrow down the developmental stage based on the universal scale associated with the products.

In one embodiment, the universal scale may be reflective of ages of pre-determined segments {'0 1', '1 2', '2 4', '4 7', '7 13'} in other embodiments the pre-determined segments may be {0-3 months, 3 months-6 months, 6 months-1 year, 1 yr.-2 yrs., 2 yrs.-3 yrs., 3 yrs.-4 yrs. 4 yrs.-6 yrs., 6 yrs.-9 yrs. and 9 yrs.-13 yrs.}

In translating to a universal scale, there may be some noise in the item catalog and/or attribute values may be missing and thus data extrapolation using various item attributes may be used to associate the item/product with a value on the universal scale. Furthermore, the respective values on the universal scale may be estimated for new products or product types without labels based on other products previously associated with the universal scale, using item attributes from catalog, co bought behavior among items, text processing and matching and extrapolation using matrix factorization. For example products with unknown values/attributes having transaction, views, and add to cart and other engagement behavior corresponding with other products having a universal scale value, the products with unknown value/attributes may be assigned a universal value equal to the corresponding products.

In accordance with the disclosed subject matter, each product or service targeted towards juveniles are associated with the universal scale value in the retailer's database 116. It is envisioned that similar universal scales may be associated with other household characteristics other than those related to juveniles. For example, the disclosed subject matter may be used to estimate education level of individuals in a household for e.g. college levels (freshmen, sophomore etc.) or any other age-based scales.

Figure 4:
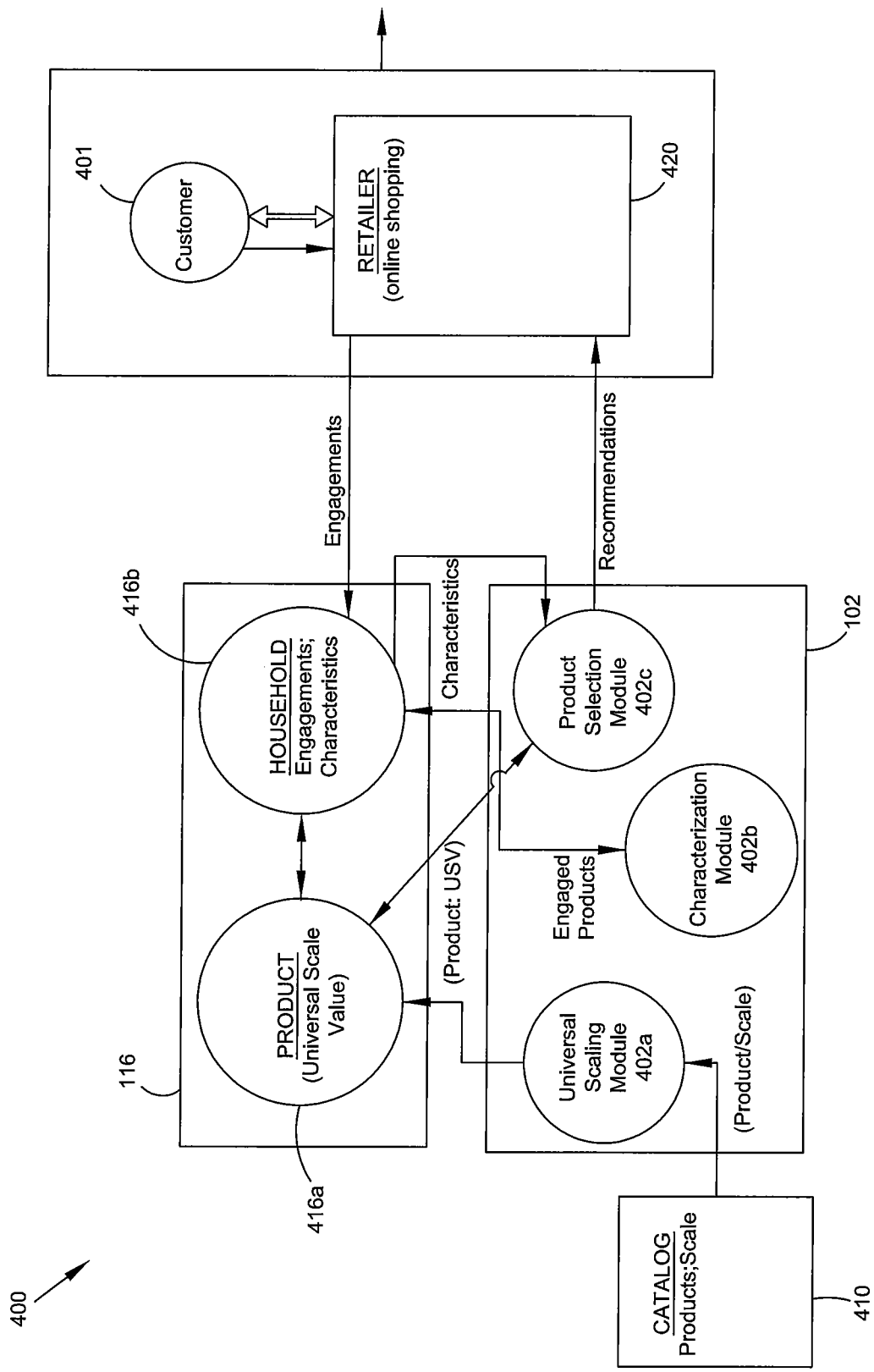
FIG. 4 is a diagram of operations of the household characteristic determining computing device in accordance with embodiments of the disclosed subject matter.

FIG. 4 illustrates of the operations of the household characteristic determining computing device 102. Accessing the retailer's catalog 410, the computing device 102 associates the products with a developmental stage/value on the universal development scale in universal scaling module 402a and then stores the value with the respective product in segment 416a of database 116. As noted above, various methods may be undertaken including accessing past engagement data stored in the database 116 in order to ensure each age dependent product related to juveniles has an associated universal value.

The computing device 102 further accesses the engagements of each particular customer's household with the age/stage dependent products stored in database segment 416b and retrieves the associated development value (universal value) stored in the database 416a. With the development values from the customer's household engagements, the computing device 102 in the characterization modeling module 402b performs Gaussian mixture modeling (where the characteristic desired in juvenile age) to determine the probability the household containing a child at one or more of the developmental stages. A Gaussian mixture model is a probabilistic model that assumes all the data points are generated from a mixture of a finite number of Gaussian distributions with unknown parameters.

The results of the Gaussian mixture modeling (e.g. likely universal scale value) is then associated with the customer's household in the database 416b. The computing device 102, may further update the stored universal scale value associated with the customer household as time elapses on a periodic basis such as monthly or yearly.

In subsequent interactions by the customer's household 401 with the retailer 420, specifically online shopping website, app or in-store communications, the computing device via the product selection module 402c retrieves the likely universal scale value representing the age/developmental stage from the database segment 416b, accesses product database 416a, and recommends selective products corresponding to the likely universal scale value (age of the juvenile). The recommendations may be in the form of presenting images of the selective products to the customer or other member associated with the customer's household via a website, applications, marketing ads via emails, text messages, mail, or social media as well as other vehicles amenable to personalized marketing.

Similarly, the household characteristic determined by the characterization module 402b may be the number of juveniles in the household. In determining the number of juveniles in the household, the computing device 102 accesses the engagements of each particular customer's household with the age/stage dependent products stored in database segment 416b and retrieves the associated development value (universal value) stored in the database 416a. With the development values from the customer's household engagements, the computing device 102 in the characterization modeling module 402b, performs a multivariate kernel density estimation to determine the number of juveniles in the household. Kernel density estimation is the process of estimating an unknown probability density function using a kernel function. Unlike a histogram that counts the number of data points in somewhat arbitrary regions, a kernel density estimate is a function defined as the sum of a kernel function on every data points. The goal of density estimation is to take a finite sample of data and to make inferences about the underlying probability density function everywhere, including where no data are observed. In kernel density estimation, the contribution of each data point is smoothed out from a single point into a region of space surrounding it. Aggregating the individually smoothed contributions gives an overall picture of the structure of the data and its density function. The estimation resolves the data into nodes, representing distinct developmental stages (i.e. separate children).

The results of the kernel density estimation (number of juveniles) is then associated with the customer's household in the database 416b. The computing device 102, may further update the number of juveniles associated with the customer's household as time elapses on a periodic basis such as monthly or yearly.

Figure 5:
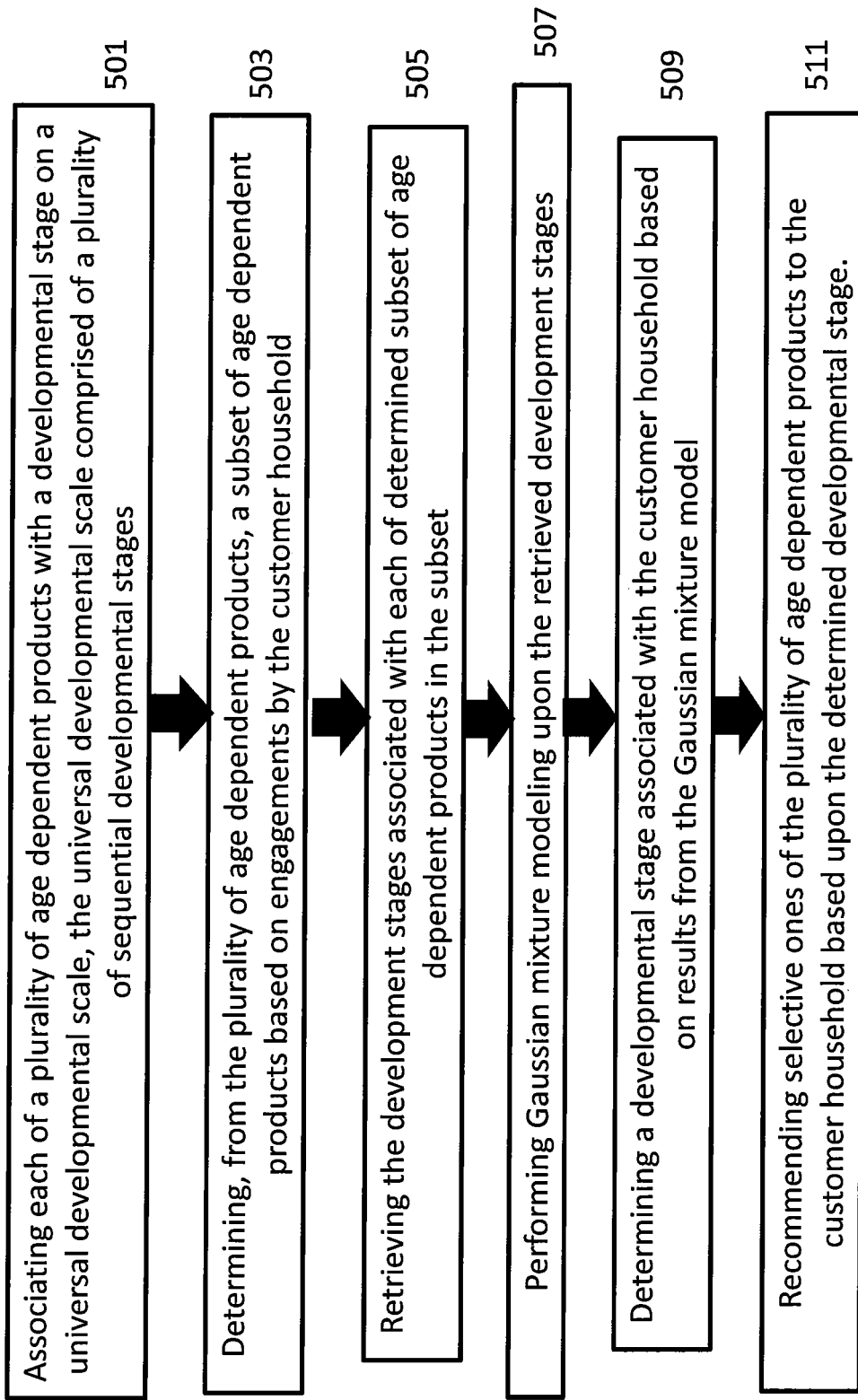
FIG. 5 is a flowchart of a method for determining a household characteristic, specifically, the age of juveniles in the customer's household in accordance with embodiments of the disclosed subject matter.

FIG. 5 is a flow diagram for a method of determining the age of juveniles in the customer's household. Prior to determining the age of juveniles in the customers household, each of a plurality of age dependent products are associated with a universal development scale as shown in Block 501. A subset of age dependent products which have been engaged by the customer's household is determined from the plurality of age dependent products, as shown in Block 503. The subset may be determined from the historical engagements with the products store in the database 116 as discussed previously. The universal development stages associated with each of the products in the subset are retrieved in Block 505 and Gaussian mixture modeling is performed upon the retrieved universal development stages as shown in Block 507. From the Gaussian mixture modeling, a universal development stage is associated with the customer's household as shown in Block 509. Using at least the universal development stage associated with the customer's household, a plurality of age dependent products may be selected and recommended to the customer's household via a website, app, or other personalized marketing channel as shown in Block 511.

Figure 6:
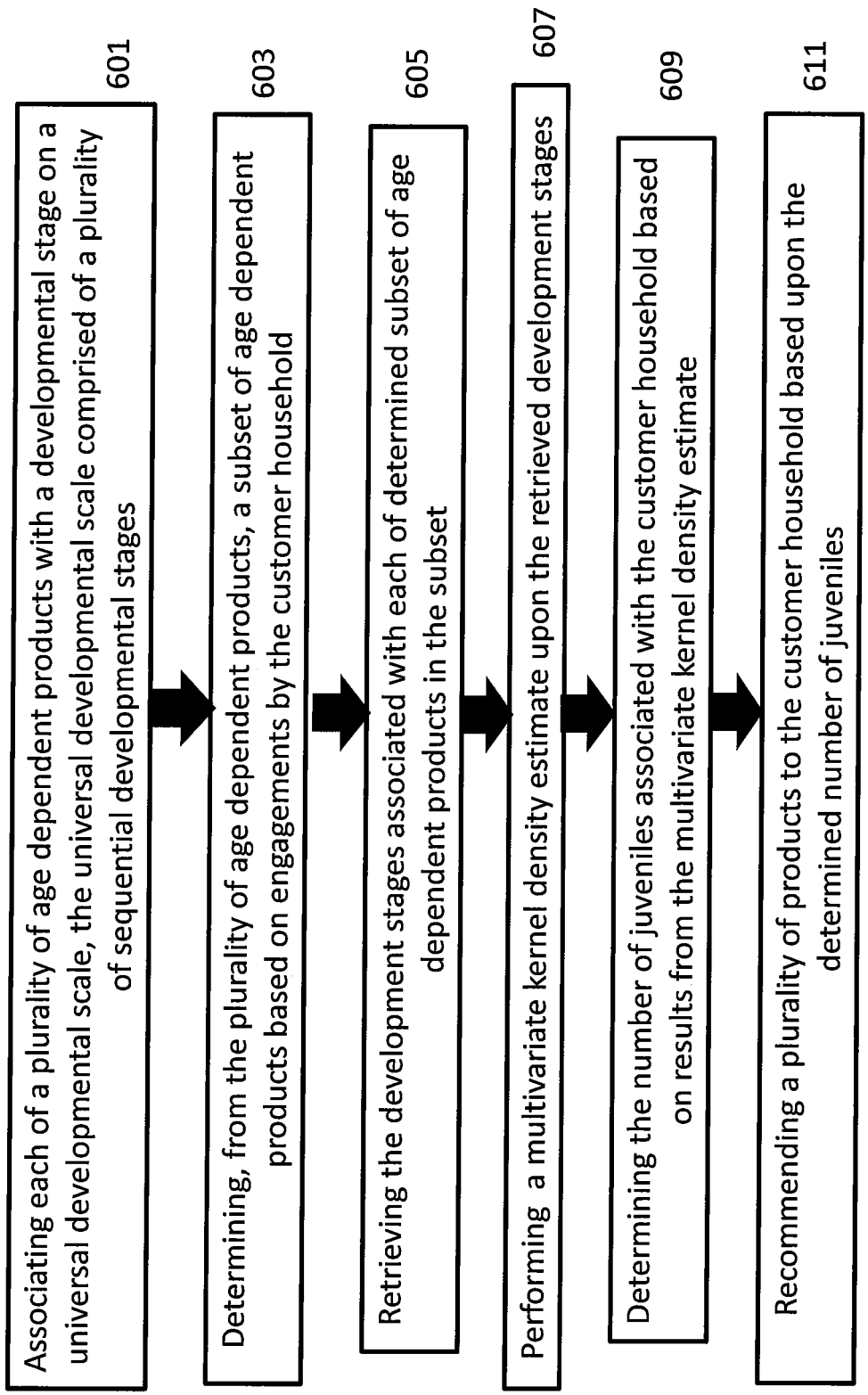
FIG. 6 is a flowchart of a method for determining a household characteristic, specifically, the number of juveniles in the customer's household in accordance with embodiments of the disclosed subject matter; and, FIG. 7 is a flowchart of a method for providing product recommendations to a customer based on the household characteristics in accordance with embodiments of the disclosed subject matter.

FIG. 6 is a flow diagram for a method of determining the number of juveniles in the customer's household. As noted earlier embodiments of the described method require products to be associated with a development stage and preferably as described herein to a universal development stage, as shown in Block 601. A subset of age dependent products which have been engaged by the customer's household is determined from the plurality of age dependent products, as shown in Block 603. The subset may be determined from the historical engagements with the products store in the database 116 as discussed previously. The universal development stages associated with each of the products in the subset are retrieved in Block 605 and unlike the previous method in which the age of the juveniles associated with the customer's household is determined, a multivariate kernel density estimate is performed upon the retrieved universal development stages as shown in Block 607. From the multivariate kernel density estimate, a number of juveniles in the household may be determined and is associated with the customer's household in database 116 as shown in Block 609. Using at least the number of juveniles associated with the customer's household, a plurality of products are selected and recommended to the customer's household via a website, app, or other personalized marketing channel as shown in Block 611. Unlike, the age determining method described in FIG. 5, the number of juveniles in the household may influence and be associated with products irrespective of whether the products/services are associated with a developmental stage, for example a customer's household with a large number of children may be offered bulk sizes of products, or less expensive product, whereas a household with a smaller number of juveniles may be offered via recommendation smaller quantity packaging or more expensive products. The ability to recommend products and services may be further enhanced using both the number of juveniles and their respective ages.

Figure 7:
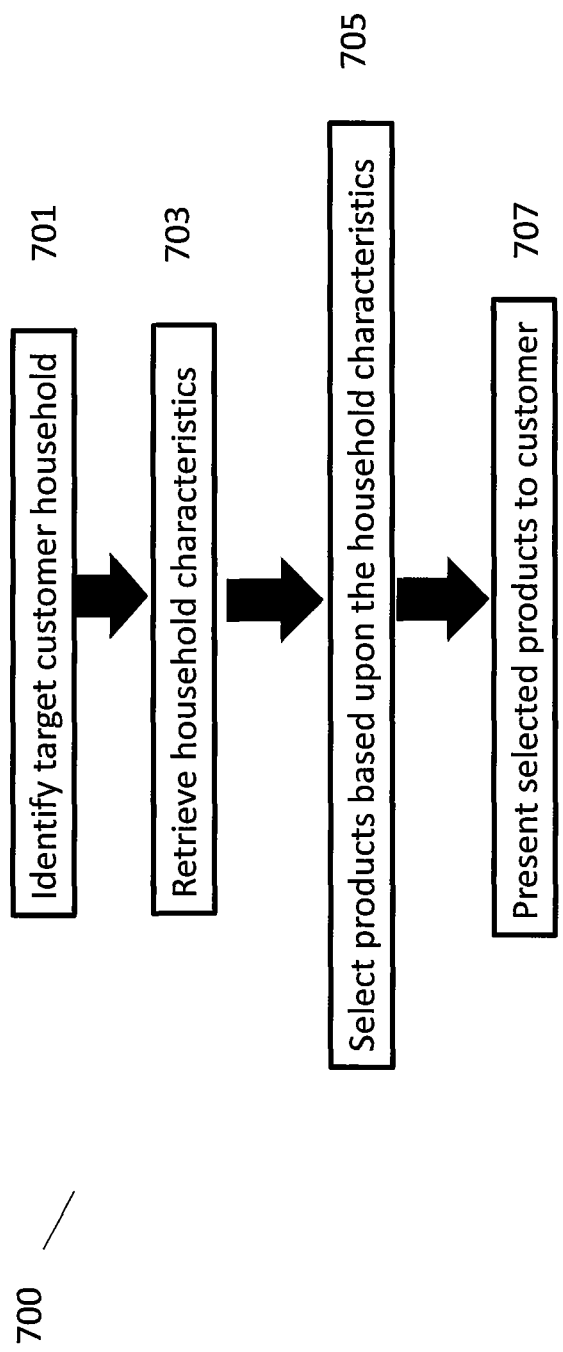

FIG. 7 is a flow diagram for a method 700 of providing product recommendations to a customer. A target customer household is first identified, as shown in Block 701, the identification may in some embodiments result from an interaction by the customer with the retailer, for example accessing the website, opening a mobile application, or entering a store etc. The customer's household may be identifiable by more than one customer, for example both a mother and father may be associated with the same household, similarly other adults aunts, uncles and grandparents may also be associated with the customer's household given a sufficient amount of purchasing behavior with respect to the household's juvenile(s). Conversely each adult customer may be associated with a unique household even if the juveniles are common for each household.

Once the customer's household has been identified, the characteristics of the household are retrieved by the computing device 102 from the database 116 as shown in Block 703. In embodiments discussed herein, the characteristics retrieved may include the number and/or ages of the juveniles within the household. Using these characteristics the computing device 102 may select specific products/services targeted to the number and/or ages of the juveniles, as shown in Block 705. The selected products are then presented to the customer as shown in Block 707. An advantage the understanding of the household characteristics allows is that rather than displaying different sizes or age ranges, the computing device 102 may recommend only those product services appropriate to the age (as reflected in the universal scale) or number of juveniles. For example in response to a customer's search query for diapers instead of showing different diaper sizes and brands, the product selected may be personalized such that the diapers recommended irrespective of brand/type would be of the appropriate size consistent with the universal scale value associated with the customer's household. Similarly, different quantities may be recommended to the customer or customer's household based on the number of juveniles in the household, for example a family with multiple children may favor the selection of bulk size packages of food, e.g. large or jumbo boxes of cereal, gallon of milk over smaller packaging sizes.

In recommending products/services to the customer, the retailer may rank products and services according to their correspondence to the household characteristics, such that they are more likely to appear in a carousel of products, or in search results presented to the customer. Additionally the determined household characteristics may be used to direct personalized marketing campaigns in and outside of electronic media, such as personalized campaigns to families with kids, for e.g.: Back to School, Kid's Fashion etc.

The results of determining the household characteristics with a Gaussian mixture model and subsequent recommendations in testing were favorable with respect to precision, recall, dot product and Jensen Shannon distance. Similar results were achieved with multivariate kernel density estimation, for the estimation of the number of juveniles.

While the disclosed subject matter is particularly amenable to determining the characteristic of a customer's household, where the customer is parent, it is similarly applicable to determining the characteristics of juveniles associated with a customer, such as brothers, sisters aunts, uncles, grandparent, god parents, family friends and other relationships that result in more than a minimal amount of and continuing engagements with age dependent products and services.

The terms juvenile(s), kid(s) and child/children are used interchangeable in describing the disclosed subject matter, no distinction between these terms is intended.

Although the disclosed subject matter describes the characteristics of the household as age(s) and number of children in the household, other household characteristics are also envisioned as determinate via the system and method described herein.

Although the methods disclosed above are described with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system for recommending products based on characteristics of a customer's household, comprising:
   a processor operably connected to a database via a communication system, the processor configured to:
   determine a plurality of types of attribute values used to measure a plurality of age dependent products belonging to different product types;
   translate all of the plurality of types of attribute values into ranges on a universal developmental scale such that each age dependent product is associated with one or more development stages each corresponding to a range on the universal developmental scale, wherein the plurality of types of attribute values include at least: age range, product size, and product stage, each related to a different product type;
   receive, from a computing device, a search query submitted by the customer;
   determine, from the plurality of age dependent products, a subset of age dependent products based on prior engagements by the customer's household;
   retrieve, from the database, the respective development stages associated with each of the age dependent products in the subset;
   determine a probability the customer's household containing a child at one or more of the retrieved development stages by performing Gaussian mixture modeling upon the retrieved developmental stages;
   determine a developmental stage associated with the customer's household based on the probability;
   determine a number of children in the customer's household by performing multivariate kernel density estimation upon the retrieved developmental stages;
   recommend selective ones of the plurality of age dependent products to the customer's household based upon the determined developmental stage associated with the customer's household, the determined number of children in the customer's household, and the search query;
   transmit, in response to the search query, the selective age dependent products to the computing device as search results; and
   validate performance of the Gaussian mixture model using an evaluation metric based on statistical reasoning.

2. The system of claim 1, wherein:
the database is configured such that the determined developmental stage is stored and associated as a characteristic of the customer's household within the database.

3. A method for recommending products based on characteristics of a customer's household, comprising:
determining a plurality of types of attribute values used to measure a plurality of age dependent products belonging to different product types;
translating all of the plurality of types of attribute values into ranges on a universal developmental scale such that each age dependent product is associated with one or more development stages each corresponding to a range on the universal developmental scale, wherein the plurality of types of attribute values include at least: age range, product size, and product stage, each related to a different product type;
receiving, from a computing device, a search query submitted by the customer;
determining, from the plurality of age dependent products, a subset of age dependent products based on engagements by the customer's household;
retrieving the respective development stages associated with each of the age dependent products in the subset;
determining a probability the customer's household containing a child at one or more of the retrieved development stages by performing Gaussian mixture modeling upon the retrieved developmental stages;
determining a developmental stage associated with the customer's household based on the probability;
determining a number of children in the customer's household by performing multivariate kernel density estimation upon the retrieved developmental stages;
recommending selective ones of the plurality of age dependent products to the customer's household based upon the determined developmental stage associated with the customer's household, the determined number of children in the customer's household, and the search query;
transmitting, in response to the search query, the selective age dependent products to the computing device as search results; and
validating performance of the Gaussian mixture model using an evaluation metric based on statistical reasoning.

4. The method of claim 3, wherein ones of the plurality of age dependent products are associated with a first scale.

5. The method of claim 4, wherein others of the plurality of age dependent products are associated with a second scale different from the first scale.

6. The method of claim 5, wherein the step of translating further comprises correlating the first and second scales with the universal developmental scale.

7. The method of claim 3, wherein the each of the plurality of developmental stages represents a time period.

8. The method of claim 3, wherein the engagements by the customer's household are selected from the group consisting of purchases, add to cart, click on, queries, search result, and views.

9. The method of claim 3, wherein the step of recommending comprises presenting images of the selective age dependent products on a website to the customer.

10. The method of claim 3, wherein selective ones of the age dependent products have a developmental stage on the universal developmental scale commensurate with the determined developmental stage.

11. The method of claim 3, wherein the step of determining a probability the customer's household containing a child at one or more of the retrieved development stages further comprises, incrementing results of the Gaussian mixture model based upon a date the Gaussian mixture model was performed.

12. A non-transitory computer readable medium having instructions stored thereon, wherein the instructions, when executed by at least one processor, cause a device to perform operations comprising:
determining a plurality of types of attribute values used to measure a plurality of age dependent products belonging to different product types;
translating all of the plurality of types of attribute values into ranges on a universal developmental scale such that each age dependent product is associated with one or more development stages each corresponding to a range on the universal developmental scale, wherein the plurality of types of attribute values include at least: age range, product size, and product stage, each related to a different product type;
receiving, from a computing device, a search query submitted by the customer;
determining, from the plurality of age dependent products, a subset of age dependent products based on engagements by the customer's household;
retrieving the respective development stages associated with each of the age dependent products in the subset;
determining a probability the customer's household containing a child at one or more of the retrieved development stages by performing Gaussian mixture modeling upon the retrieved developmental stages;
determining a developmental stage associated with the customer's household based on the probability;
determining a number of children in the customer's household by performing multivariate kernel density estimation upon the retrieved developmental stages;
recommending selective ones of the plurality of age dependent products to the customer's household based upon the determined developmental stage associated with the customer's household, the determined number of children in the customer's household, and the search query;
transmitting, in response to the search query, the selective age dependent products to the computing device as search results; and
validating performance of the Gaussian mixture model using an evaluation metric based on statistical reasoning.

13. The non-transitory computer readable medium of claim 12, wherein ones of the plurality of age dependent products are associated with a first scale.

14. The non-transitory computer readable medium of claim 13, wherein others of the plurality of age dependent products are associated with a second scale different from the first scale.

15. The non-transitory computer readable medium of claim 14, wherein the operation of translating further comprises correlating the first and second scales with the universal developmental scale.

16. The non-transitory computer readable medium of claim 12, wherein the each of the plurality of developmental stages represents a time period.

17. The non-transitory computer readable medium of claim 12, wherein the engagements by the customer's household are selected from the group consisting of purchases, add to cart, click on, queries, search result, and views.

18. The non-transitory computer readable medium of claim 12, wherein the instructions for the operation of recommending further comprises instructions for presenting images of the selective age dependent products on a website to the customer.

19. The non-transitory computer readable medium of claim 12, wherein selective ones of the age dependent products have a developmental stage on the universal developmental scale commensurate with the determined developmental stage.

20. The non-transitory computer readable medium of claim 12, wherein the instructions for the operation of determining a probability the customer's household containing a child at one or more of the retrieved development stages further comprises, incrementing results of the Gaussian mixture model based upon a date the Gaussian mixture model was performed.

* * * * *